Patented Nov. 24, 1953

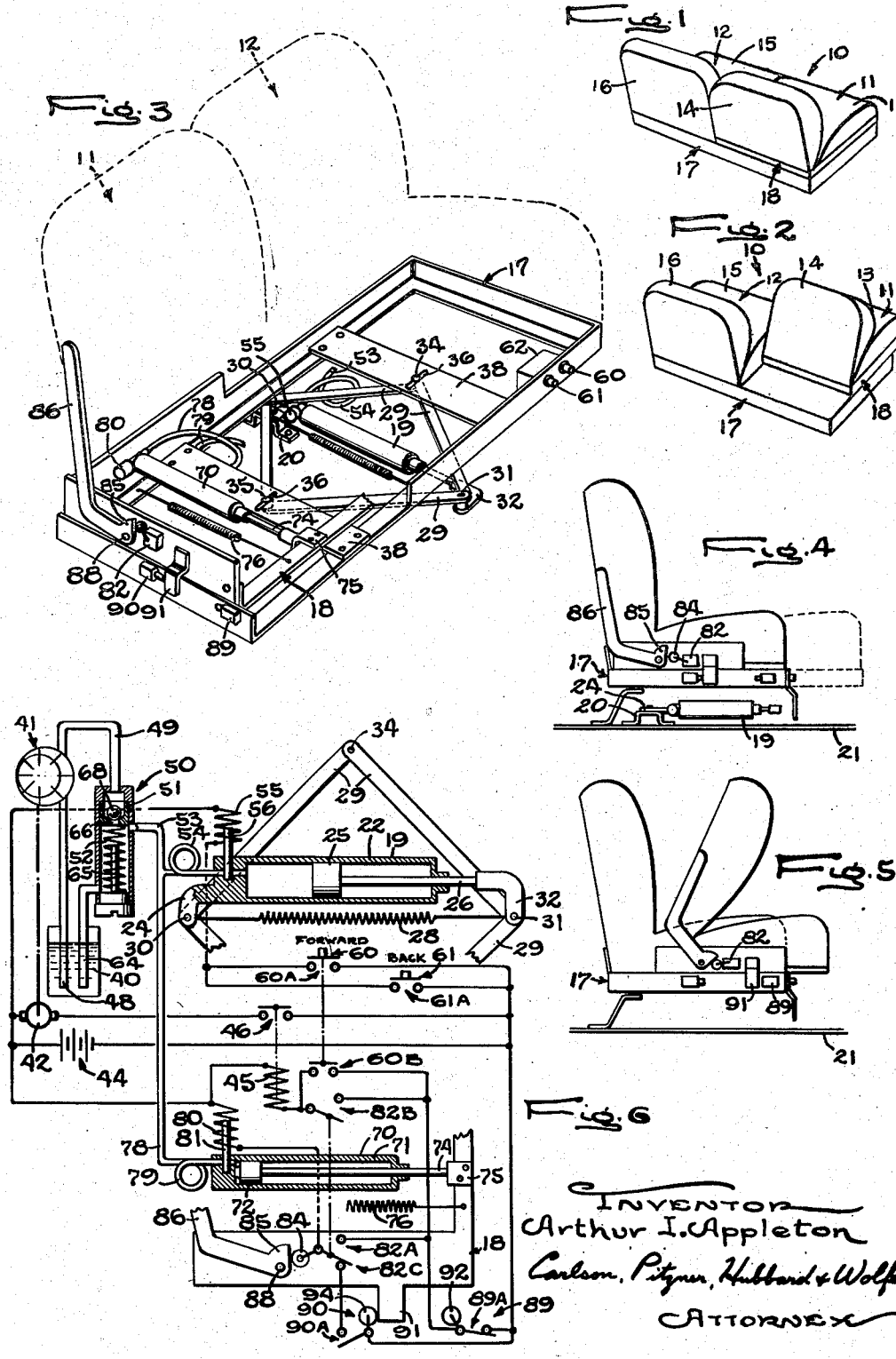

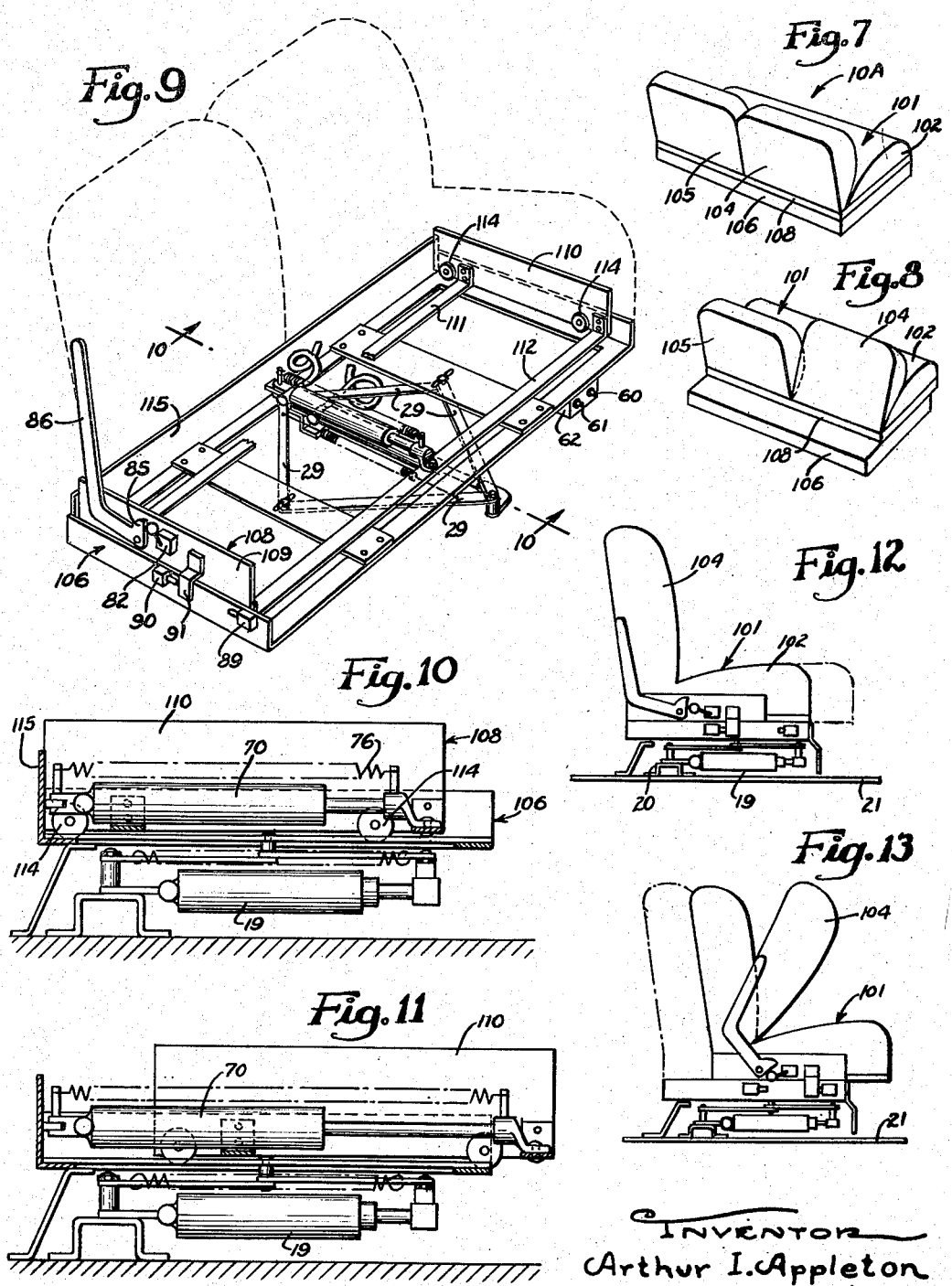

2,660,223

UNITED STATES PATENT OFFICE 2,660,223

AUTOMOBILE SEAT STRUCTURE

Arthur I. Appleton, Northbrook, Ill.

Application April 11, 1951, Serial No. 220,457

15 Claims. (Cl. 155—15)

The present invention relates in general to the automotive field and more specifically to a novel seat structure finding particular but not exclusive utility in automobiles of the two-door type having both front and rear seats. This application is a continuation-in-part of my earlier application Serial No. 208,641, now abandoned, filed in the United States Patent Office on January 30, 1951.

The general aim of the invention is to provide an automobile seat structure having a selectively positionable seat unit which can be temporarily displaced from its selected position to provide greater access to the space behind such seat unit, being returned to its previous selected position after such temporary displacement.

One object of the invention is to provide a power actuated automobile seat structure having a seat unit with a tiltable back and capable of being positioned in a fore-and-aft direction by appropriate selective positioning means, the seat unit also being adapted to be temporarily displaced from and returned to its previously selected position as an incident to tilting movement of the tiltable back.

Another object is to provide an automobile seat structure with a selectively positionable power actuated seat unit of the character set forth and including means for temporarily displacing and then returning said seat unit to its selected position, such means being capable of operating in conjunction with the power actuated selective positioning system of the seat unit without disrupting the normal operation of such system.

In one of its more specific aspects, it is an object of the invention to provide a novel automobile seat structure having a seat unit capable of being selectively positioned in a fore-and-aft direction in unison with an adjacent seat unit but also being independently positionable to provide greater access to the space behind such seat unit.

A further and more specific object of the invention is to provide a seat structure of the character set forth and having an independently positionable seat unit which can be subjected to a complete cycle of independent movement without changing the previously selected common position of such unit and the seat unit adjacent thereto.

Other objects and advantages will become apparent as the following description proceeds, taken in connection with the accompanying drawings, in which:

Figure 1 is a rear perspective diagrammatic view of an automobile seat structure constituting one illustrative embodiment of the present invention and having an independently positionable seat unit arranged for selective positioning in unison with an adjacent seat unit.

Fig. 2 is a view similar to Fig. 1 but showing the independently positionable seat unit in its extended position.

Fig. 3 is an enlarged perspective view detailing the supporting and actuating mechanism for the seat structure illustrated in Fig. 1.

Figs. 4 and 5 are enlarged side elevational views showing sequentially certain steps in the operation of the independently positionable seat unit of Figs. 1 and 3.

Fig. 6 is a diagrammatic view detailing the power actuating means associated with the seat structure of Figs. 1 to 5.

Fig. 7 is a rear perspective diagrammatic view of another form of seat structure illustratively embodying a modification of the present invention.

Fig. 8 is a view similar to Fig. 7 but showing the illustrative structure with the seat unit in its temporarily displaced position.

Fig. 9 is an enlarged perspective view detailing the supporting and actuating mechanism for the seat structure illustrated in Figs. 7 and 8.

Figs. 10 and 11 are enlarged vertical sectional views taken in the plane of the line 10—10 in Fig. 9 and showing sequentially certain steps in the operation of the seat structure of Figs. 7 and 8.

Figs. 12 and 13 are enlarged side elevational views illustrating the seat unit in positions corresponding respectively to those indicated in Figs. 10 and 11.

While the invention is susceptible of various modifications and alternative constructions, certain preferred embodiments have been shown in the drawings and will be described below in considerable detail. It should be understood, however, that there is no intention to limit the invention to the specific forms disclosed, but on the contrary, the intention is to cover all modifications and alternative constructions falling within the spirit and scope of the invention as expressed in the appended claims.

Referring more specifically to Figs. 1 to 6, inclusive, there is shown a novel seat structure 10 which illustratively embodies one aspect of the invention and happens to be adapted for use as the front seat in an automobile of the two-door type. The illustrative seat structure 10 comprises a seat unit 11 and an adjacent seat unit 12, together with appropriate power actuated adjusting means for controllably varying the normal position of the seat units 11 and 12 in unison in a fore-and-aft direction. In the present instance, the seat unit 11 is susceptible of being temporarily displaced in a forward direction from the previously selected common position in order to provide greater access to the space behind the unit 11. By the same token, the seat unit 11 is returnable to the common selected position after a cycle of temporary displacement. The seat unit 11, which might be on the passenger's side, includes a cushion 13 and a tiltable back member 14. The seat unit 12, which might be on the driver's side, includes a cushion 15 and a tiltable back 16. The illustrative seat structure 10 is also provided with a main frame or carriage 17 which is disposed in supporting and underlying relation with both of the seat units 11, 12. The carriage 17 may be slidably attached to the floor of the automobile in any suitable manner and is capable of being adjustably positioned in a fore-and-aft direction relative to the floor, permitting selective adjusting movement of both seat units in unison. Interposed between the seat unit 11 and the main carriage 17 is an auxiliary frame or carriage 18 which is movable in a fore-and-aft direction relative to the main carriage 17, the cushion 13 and tiltable back member 14 of the unit 11 being mounted on the auxiliary carriage 18 for movement therewith. In the use of structure 10, movement of the seat unit 11 in a forward direction to provide greater access to the space behind the seat units, as well as return movement of the unit 11 to its original and previously selected position common to the seat unit 12, may be accomplished by the simple expedient of applying a rocking movement to the back member 14 of the seat unit 11.

In order to permit selective adjustment of the position of the seat units 11, 12 in unison relative to the automobile floor, the seat structure 10 is equipped in the present instance with a main hydraulic actuator 19 interposed between the main carriage 17 and a bracket 20 attached to the automobile floor, the latter being designated by the reference numeral 21. The actuator 19 happens to be of the single acting type, comprising a cylinder 22 having a mounting arm 24 fixed to its head end for attachment to the bracket 20 (see Figs. 3 and 6). Housed within the cylinder 22 are a piston 25 and a piston rod 26 which work in opposition to a tensile loading spring 28 associated with the actuator 19. Force is transmitted from the actuator 19 to the main carriage 17 by means which in this case comprises a parallelogram linkage defined by pivotally connected links 29. One pivot element 30 between the links 29 is connected to the bracket 20 while the pivot element 31 diagonally opposite the element 30 is connected to the projecting end of the piston rod 26 as by means of an arm 32. The remaining diagonally opposed pivot elements 34, 35 of the parallelogram linkage are connected to the main carriage 17 as by means of slots 36 in cross braces 38 of the carriage.

Pressure fluid may be supplied to the main actuator 19 from a reservoir 40 by means of a pump 41 driven by an electric motor 42. The latter may conveniently be energized from the battery 44 of the automobile as by means of a relay 45 having a set of normally open switch contacts 46. When driven by the motor 42, the pump 41 supplies fluid from the reservoir 40 to a suction conduit 48 and discharges such fluid under pressure into pressure conduit 49 which conducts it to a spring loaded relief valve 50. Slidably mounted within the valve 50 is a sleeve element 51 which is adapted to move in a direction to compress its biasing spring 52 in response to the pressure of fluid admitted from the conduit 49. Such movement permits pressure fluid to flow from the conduit 49 into a second discharge conduit 53 which leads to the head end of the actuator cylinder 22. The conduit 53 may be flexible throughout a portion or all of its length and in the present instance has a loop 54 to provide slack for movement of the carriage 17. Admission of pressure fluid to the interior of the cylinder 22, or exhausting of fluid therefrom, is governed by means of a solenoid control valve 55 having a movable plunger 56 which normally blocks the inlet from the conduit 53 to the head end of the cylinder 22.

The foregoing mechanism may be controlled by means of normally open forward and reverse switches 60, 61 housed within a common casing 62 which is mounted on the main carriage 17 in an easily accessible location. Although the parts 60, 61 are shown as separate switches with individual operating elements, it will be appreciated that a double pole, double throw switch having a single operating element would serve with equal facility. The switch 60 includes normally open contacts 60A which are interposed in the power supply circuit of the solenoid control valve 55 of the main actuator, and normally open contacts 60B which are interposed in the power supply circuit of motor control relay 45. The contacts 60A, 60B are mechanically interconnected for operation in unison. The reverse switch 61, on the other hand, simply comprises normally open contacts 61A which are interposed in the power supply circuit of the solenoid control valve 55, being connected in parallel with the contacts 60A.

When both of the seat units 11 and 12, along with the main carriage 17, are to be adjusted in unison in a forward direction, the forward switch 60 is depressed, closing the contacts 60A, 60B, and energizing the solenoid control valve 55 as well as the pump drive motor 42. Upon lifting of the plunger 56 of the solenoid control valve 55, pressure fluid is admitted to the head end of the actuator 19 via the conduit 49, the relief valve 50, and the conduit 53. This forces the piston 25, the connecting rod 26 and the parallelogram pivot elements 31, 34, 35 to the right (as viewed in Fig. 6) and thereby moves the main carriage 17 and the seat units 11, 12 forwardly. Such movement is, of course, yieldably resisted by the loading spring 28. When the seat units have reached the desired position, the forward switch 60 may then be released, thereby deenergizing the pump driving motor 42 and the solenoid control valve 55. This locks pressure fluid within the head end of the main actuator 19 and serves to maintain the seat units 11, 12 in their common adjusted position. If, on the other hand, it be desired to move the seat units 11, 12 in unison rearwardly to a different position, it is only necessary to depress the reverse switch 61 which energizes the solenoid control valve 55 and lifts its plunger 56. Such action permits pressure fluid to escape from the head end of the actuator 19, permitting the main carriage 17 to move rearwardly under the action of the loading spring 28. Pressure fluid exhausted from the main actuator cylinder 22 passes through the conduit 53 and thence under the movable member 51 of the relief valve 50, emptying from the body of the latter into the reservoir 40 via a discharge conduit 64. When the carriage 17 and seat units 11, 12 have reached the desired position, the reverse movement may be arrested by simply releasing the reverse switch 61, such action deenergizing the solenoid control valve 55 and permitting the plunger 56 to descend and seal in the pressure fluid remaining within the head end of the main actuator cylinder 22.

To protect the hydraulic apparatus against an overload in the event that the seat units 11, 12 should encounter an obstruction during their common forward movement, the relief valve 50 is provided with a stationary upstanding pin 65 of appropriate diameter to enter an orifice 66 in the movable element 51. During normal operation, the element 51 simply moves downwardly against its bearing spring 52 until communication is estabished between the pressure conduits 49, 53 but stops before the end of the pin 64 makes contact with ball 68 which seals the orifice 66. In the event of an overload, the pressure built up thereby forces the element 51 further down, causing the pin 65 to unseat the ball 68 and dumping the excess pressure into the reservoir 40 via the exhaust conduit 64.

In order to make the space behind the seat units 11, 12 more accessible, shifting means is provided for temporarily shifting the seat unit 11 and its associated back member 14 bodily to an extreme forward position in response to forward tilting of the back member 14, and for returning the unit 11 in a rearward direction to its original position as an incident to rearward tilting of the member 14, all without disturbing the previously selected common adjusted position of the seat units 11, 12. This is accomplished in the present instance by the use of the auxiliary carriage 18 and by interposing an auxiliary actuator 70 between the main carriage 17 and the auxiliary carriage 18 (see Figs. 3 and 6). The actuator 70 is similar to the main actuator 19 but may be somewhat smaller, comprising a cylinder 71 anchored at its head or rearward end in any suitable manner to the main carriage 17. Slidably housed within the cylinder 71 is a piston 72 which is fixed to a piston rod 74, the latter having at its projecting end a bracket 75 which is fixed to the auxiliary carriage 18. Also interposed between the carriages 17, 18 and arranged to act in opposition to the actuator 70 is a tensile loading spring 76 similar to the loading spring 28 of the main actuator. Pressure fluid is conducted to the head end of the actuator 70 by means of a branch conduit 78 connected to the conduit 53 and which includes a flexible portion represented by the loop 79. The actual admission of pressure fluid into the cylinder 71 or the exhaustion of fluid therefrom is governed by means of a solenoid control valve 80 at its head end. The valve 80 is generally similar to the valve 55, being equipped with a movable plunger 81 adapted to open or to block communication between the conduit 78 and the cylinder 71.

Control of the auxiliary actuator 70 in response to forward or rearward tilting of the back member 14 is accomplished in this instance by the use of a double pole, double throw switch 82 (Figs. 4, 5 and 6) having an operating element such as a roller 84 which may be mounted on a suitably biased operating member. The switch 82 is mounted in such a position on the carriage 18 that the roller 84 will intercept a cam element 85 which happens to be integral with or fixed to a hinge bracket 86 on the seat back member 14. The hinge bracket 86 is pivoted to the auxiliary carriage 18 as by means of a trunnion element 88. Housed within the switch 82 are normally open contacts 82A, 82B mechanically interconnected for operation in unison and adapted respectively to energize the solenoid control valve 80 of the auxiliary actuator 70, and the motor control relay 45, via normally closed contacts 89A of a front limit switch 89. Also housed within the switch 82 are normally closed contacts 82C which are adapted to energize the solenoid control valve 80 via normally open contacts 90A of a rear limit switch 90. Both of the limit switches 89, 90 are in this instance fixed to the main carriage 17.

In operation, when the back member 14 of the seat unit 11 is tilted forwardly, the cam element 85 accosts the operating element 84 of the switch 82 and moves such element in a counterclockwise direction, closing the normally open contacts 82A, 82B. This energizes the pump control relay 45 and the solenoid control valve 80, starting the pump motor 42 and lifting the plunger 81 of the valve 80. Accordingly, pressure fluid is conducted from the pump 41 via the conduit 49, the relief valve 50, the conduit 53, and the conduit 78, entering the head end of the auxiliary actuator cylinder 71 and forcing the piston 72 and its piston rod 74 to the right or in a forward direction against the force of the loading spring 76. Such action moves the auxiliary carriage 18 in a forward direction relative to the main carriage 17, carrying with it the seat unit 11 and the back member 14 as indicated in Figs. 2 and 5. The forward movement of these units continues until the abutment 91 of the auxiliary carriage 18 accosts operating element 92 of the front limit switch, opening the contacts 89A and deenergizing both the relay 45 and the solenoid control valve 80. This locks pressure fluid within the actuator 70 and arrests the forward movement of the auxiliary carriage 18, the seat unit 11 and its back member 14, holding such members in their extreme forward position. If, under these conditions, the back member 14 should be tilted rearwardly to its original and normal attitude, the cam element 85 permits the biased operating element 84 of the switch 82 to move in a clockwise direction (as viewed in the drawing), opening the contacts 82A, 82B and closing the contacts 82C. Since the carriage 18 and the members thereon are in their extreme forward position when this occurs, the contacts 90A of the rear limit switch 90 are in a closed position, permitting the solenoid control valve 80 to be energized when the contacts 82C are closed. Such action permits pressure fluid to be exhausted from the head end of the auxiliary actuator cylinder 71 and returned to the reservoir 40 via the relief valve 50 and the exhaust conduit 64, allowing the members defining the seat unit 11 as well as the auxiliary carriage 18 to move rearwardly in response to the tensile force of the loading spring 76. This rearward movement continues until the carriage 18 and the seat unit 11 thereon have returned to their original position, illustrated in Figs. 1 and 4, at which time the abutment 91 accosts operating element 94 of the rear limit switch 90. Such action opens the contacts 90A of the rear limit switch 90 and deenergizes the solenoid control valve 80. This completes one independent operating cycle for the seat unit 11 and the auxiliary carriage 18 associated therewith. Since these members move relative to the main carriage 17 and operate without disturbing its power actuating means, it will be appreciated that the action just described can take place without disturbing the previously selected common position of adjustment of both seat units 11 and 12.

Turning now to Figs. 9 to 13, inclusive, there is shown an illustrative seat structure 10A which exemplifies another aspect of the present invention. The seat structure 10A includes a seat unit 101 having a cushion 102 and a divided back defined by a pair of tiltable back members 104, 105, together with an appropriate supporting and actuating means. The seat unit 101, including the divided back, may be selectively positioned in a fore-and-aft direction relative to the automobile floor in any suitable manner, as by the use of suitable power actuated and control means.

Provision is made for temporarily displacing the seat unit 101 in a forward direction from its previously selected position, and for returning the seat unit 101 rearwardly to such selected position, as an incident to fore-and-aft tilting of one of the back members. This is accomplished in the present instance by the use of a main carriage 106 and an auxiliary carriage 108, both disposed in supporting and underlying relation with the seat unit 101. The main carriage 106 may be supported on the automobile floor in any suitable manner for fore-and-aft movement relative thereto. The auxiliary carriage 108 is mounted on the main carriage 106, being susceptible of bodily movement therewith or relative movement in a fore-and-aft direction with respect thereto. The carriages 106, 108 and the seat unit 101 may be controlled and actuated by means of a hydraulic system such as the one illustrated in Fig. 6 and described earlier herein. Consequently, a detailed description of such system will be unnecessary at this point and the present description can be confined primarily to certain structural differences between the seat structure 10A and the seat structure 10.

The main carriage 106 of the structure 10A is substantially identical with the main carriage 17 of the seat structure 10. In general, it comprises a rectangular frame adapted to be selectively positioned along the floor 21 of the automobile by means of the main hydraulic actuator 19. The actuator 19 is anchored at one end to the floor bracket 28 and is connected to the main carriage 106 through the parallelogram links 29. The main carriage 106 and the seat unit 101 supported thereon may be adjustably positioned through the use of forward and reverse switch means 60, 61 housed within a casing 62 which in this case is mounted under the main carriage.

The auxiliary carriage 108 is also fashioned in the form of a rectangular frame and in this case comprises upright side panels 109, 110 connected by appropriate cross members 111, 112. The auxiliary carriage 108 is nestingly disposed within the main carriage 106 and may include roller elements 114 to facilitate sliding movement relative to the main carriage. The cushion 102 and back members 104, 105 are mounted on the carriage 108 in any suitable manner and are movable bodily therewith.

For the purpose of effecting forward displacement of the seat unit 101 in response to forward tilting of one of the back members, for example, the member 104, the auxiliary actuator 70 is interposed between back panel 115 of the main carriage 106 and the forward transverse structural member 112 of the auxiliary carriage 108 (see Figs. 9 to 11). In this case, the actuator 70 happens to be mounted centrally of the carriages and substantially overlies the main actuator 19. The loading spring 76 is stretched between a pair of upstanding pins affixed adjacent the respective extremities of the relatively movable parts of the actuator 70.

Control of the movements of the auxiliary actuator and hence of the auxiliary carriage 108 may be accomplished by the use of substantially the same arrangement utilized for control of the auxiliary carriage 18. Accordingly, the side panel 109 of the auxiliary carriage 108 has fixed thereto the control switch 82 which may be actuated by the cam 85 on hinge member 86 of the back member 104. The side panel 109 also carries the depending abutment 91 which is adapted to actuate limit switches 89 and 90 mounted on the main carriage 106.

While the operation of the seat structure 10A will undoubtedly be apparent to those skilled in the art, a brief synopsis might be appropriate at this point. Initially, the seat unit 101 may be selectively positioned in a fore-and-aft direction by the use of forward or reverse switches 60, 61 which control the main hydraulic actuator 19 in the manner described earlier herein. Temporary forward displacement of the seat unit 101, from the selected position indicated in solid outline in Fig. 12 to the extended position indicated in dot-dash outline, may be initiated by tilting the back member 104 forwardly. This causes the cam 85 to actuate the control switch 82 so as to close normally open switch contacts 82A and 82B. This action starts the pump 41 and opens the solenoid control valve of the auxiliary actuator 70 so as to admit pressure fluid to the latter and move the auxiliary carriage 108 forward against the action of the loading spring 76.

By the time the seat unit 101 has arrived at the forwardly extended position indicated in Figs. 11 and 13, the abutment 91 of the auxiliary carriage 108 opens the limit switch 89 and de-energizes the pump driving motor and the solenoid 80 of the auxiliary actuator control valve. This traps pressure fluid within the auxiliary actuator 70 and holds the seat unit 101 in its forwardly displaced position. If, under these conditions, the back member 104 be tilted rearwardly to its normal attitude, the control switch 82 is actuated to close the contacts 82C, resulting in energizing of the solenoid 80 and exhausting of pressure fluid from the auxiliary actuator 70. Consequently, the auxiliary carriage 108 and the seat unit 101 are permitted to move rearwardly under the action of the biasing spring 76 until the carriage 108 accosts the rear panel 115 of the main carriage, or some other appropriate mechanical stop. At this point, the depending abutment 91 opens the rear limit switch 90 and de-energizes the solenoid 80 of the auxiliary actuator control valve.

The illustrative seat structures 10, 10A described herein may be modified within the scope of my invention by eliminating or altering certain elements. The auxiliary carriage may, for example, be eliminated completely and the temporary forward displacement of the seat unit may be accomplished by the use of a single actuator. By the same token, in a double seat unit installation, the main carriage or frame 17 common to the two seat units 11, 12 may be eliminated and each seat unit may be provided with an individual actuator. The two seat units would be interlocked for operation in unison, with provision for releasing the interlocking upon forward tilting of one of the back members and for then operating only the actuator associated with the seat unit having the tilted back member.

Still another variant of the invention would include an arrangement having a single actuator for both seat units with a mechanical coupling between such actuator and the seat units. The coupling would be responsive to tilting of one of the back members, permitting movement of the seat units in unison or, alternatively, movement of only one of the seat units.

I claim as my invention:

1. An automobile seat structure comprising, in combination, a seat unit having a tiltable back member, an auxiliary frame underlying said seat unit and interconnected therewith for transmitting fore-and-aft movement thereto, a main frame underlying said auxiliary frame, said frames being movable relative to each other in a general fore-and-aft direction and said main frame being movable relative to the floor of the automobile also in a general fore-and-aft direction, means including a hydraulic actuator interposed between said main frame and the floor of the automobile for selectively positioning said main frame, said auxiliary frame, and seat unit relative to the floor, means including a second hydraulic actuator interposed between said auxiliary frame and said main frame, and a control for said second hydraulic actuator responsively associated with said tiltable back member, said control being operable to energize said second actuator for temporarily displacing said auxiliary frame and said seat unit in a forward direction from their normal position on said main frame as an incident to tilting of said back member.

2. A power actuated automobile seat structure comprising, in combination, a seat unit including a cushion and a tiltable back member, power actuated adjusting means for controllably varying the position of said seat unit in a forward and rearward direction relative to the floor of the automobile, and shifting means responsively interconnected with said back member and mechanically connected to said seat unit for temporarily displacing said seat unit in a forward direction and for returning said seat unit to its selected position as an incident to tilting of said back member.

3. In a seat structure for use in a passenger automobile and having a seat unit which includes a tiltable back member, the combination of adjusting means for selectively positioning the seat unit in a fore-and-aft direction, with shifting means interengageable responsively with said back member and mechanically connected to said seat unit for temporarily displacing the seat unit forwardly from its selected position as an incident to forward tilting of the tiltable back member and for returning the unit to its previously selected position as an incident to rearward tilting movement of the tiltable back member.

4. A seat structure for use in automobiles of the two-door type and comprising, in combination, a seat unit having a tiltable back member, adjusting means for controllably adjusting the normal position of said seat unit in a forward and rearward direction relative to the floor of the automobile, and reverse shifting means responsively associated with said back member and mechanically associated with said seat unit for displacing said seat unit in a forward and rearward direction as an incident to tilting of said back member without permanently disturbing the adjusted normal position of said seat unit effected by said first means.

5. An automobile seat structure comprising the combination of a seat unit having a tiltable back member, said seat unit being mounted for bodily movement in a fore-and-aft direction relative to the automobile floor, a power actuated adjusting means interposed between the floor and said seat unit, control means for selectively adjusting the normal position of said seat unit relative to the floor through said power actuated means, shifting control means for effecting a temporary forward displacement of said seat unit from its selected normal position and for effecting a return of said seat unit to said normal position, and means associated with said back member and said shifting control means for operating the latter in response to tilting movement of the former.

6. In a seat structure for an automobile, the combination comprising a seat unit having a tiltable back member, said seat unit being mountable on a support for bodily movement relative thereto, means for selectively positioning said seat unit relative to said support, a hydraulic actuator disposed between said seat unit and said support, a source of pressure fluid, a supply conduit for conducting pressure fluid to said actuator, a solenoid control valve in said supply conduit for governing the admission of pressure fluid to said actuator, a normally open control switch responsive to forward tilting of said back member for energizing said solenoid control valve to open the same, an abutment on said seat unit, and a normally closed forward limit switch interposed in the power supply circuit of said control valve, said forward limit switch having an operating element adapted to open the same upon accosting of said element by said abutment.

7. An adjustably positionable automobile seat structure comprising, in combination, a seat unit including a tilting back member, a movable frame underlying said seat unit in supporting relation therewith, a hydraulic actuator interposed between the floor of the automobile and said frame for selectively adjusting the normal position of said seat unit relative to the floor, a second hydraulic actuator interposed between said frame and said seat unit for shifting the latter relative to said frame, a source of pressure fluid, electrical control means for admitting pressure fluid to said second hydraulic actuator or for exhausting fluid therefrom, operating means interposed between said seat unit and its back member for operating said electrical control means in response to tilting of said back member, an abutment fixed to said seat unit for movement therewith, and a limit switch on said frame disposed for interception of said abutment, said limit switch being adapted to deenergize said electrical control means at one extreme of movement of said seat unit.

8. In an automotive front seat structure of the character set forth and having a motor driven pressure fluid pump together with a fluid reservoir, the combination comprising a first hydraulic actuator disposed for operation in opposition to a loading spring, relief valve means, a first pressure fluid conduit between the pump and said relief valve means, a second pressure fluid conduit between said relief valve means and said first hydraulic actuator, a solenoid control valve in said second pressure fluid conduit, a pressure actuated movable member within said relief valve adapted to permit communication directly between said pressure fluid conduits or alternatively between said second pressure fluid conduit and an exhaust conduit, a pump motor control relay, selector switch means for simultaneously energizing said pump motor control relay and said solenoid control valve or for alternatively energizing only said solenoid control valve, a second hydraulic actuator disposed for operation in opposition to a loading spring, a branch conduit connecting said second hydraulic actuator with said second pressure fluid conduit, a second solenoid control valve interposed in said branch conduit, control switch means for simultaneously energizing said pump motor control relay and said second solenoid control valve or alternatively energizing only said second solenoid control valve, said control switch means being adapted to effect movement of said second hydraulic actuator in either direction, and spaced apart limit switches connected with said control switch means and adapted respectively to define the extremities of movement of said second hydraulic actuator.

9. A front seat structure for automobiles and comprising, in combination, a first seat section having a tiltable back member thereon, a second seat section also having a tiltable back member thereon, power actuating means for moving one of said seat sections relative to the other, and control means operatively connected with said power actuating means and interengageable responsively with said back member associated with said one seat section to control said power actuating means in response to tilting movement of said last mentioned back member.

10. A power operated automobile seat structure comprising, in combination, a first seat unit having a tiltable back member, a second seat unit also having a tiltable back member, a movable main carriage disposed in supporting relation with said seat units for movement of the same in unison, power actuating means for selectively positioning said main carriage relative to the floor of the automobile, an auxiliary carriage interposed between said main carriage and said second seat unit, said auxiliary carriage and said second seat unit being movable relative to said main carriage and said first unit, and a second power actuating means interposed between said main carriage and said auxiliary carriage for moving the latter relative to the former, said second power actuating means being controllable in response to tilting of the back member of said second seat unit.

11. An automobile seat structure comprising the combination of a first seat unit having a tiltable back member, a second seat unit also having a tiltable back member, a main frame underlying said seat units and supporting the same for movement in unison, a main hydraulic actuator interposed between said main frame and the floor of the automobile, an auxiliary frame interposed between said main frame and said second seat unit, said auxiliary frame and said second seat unit being movable relative to said main frame and said first seat unit, an auxiliary hydraulic actuator interposed between said main frame and said auxiliary frame, and means for controlling said auxiliary actuator in response to tilting of the back member associated with said second seat unit.

12. A seat structure for an automobile of the two-door type and comprising, in combination, a pair of individual seat units each having a corresponding tiltable back member, said seat units being mountable on a support, one of said seat units and its back member being bodily movable relative to the other of said seat units and to said support, means for selectively adjusting the normal position of said seat units in unison, a hydraulic actuator disposed between said movable seat unit and the support, a source of pressure fluid, a supply conduit for conducting pressure fluid to said actuator, control valve means in said supply conduit, and means interengageable responsively with said back member of said movable seat unit for operating said control valve means in response to tilting of said last mentioned back member.

13. An automobile seat structure comprising, in combination, a seat unit having a pair of individually tiltable back members, an auxiliary carriage underlying said seat unit and bodily movable therewith, a main carriage underlying said auxiliary carriage, said carriages being movable relative to each other in a fore-and-aft direction and said main carriage being movable relative to the floor of the automobile in the same general direction, means for selectively positioning said main carriage together with said auxiliary carriage and said seat unit relative to the floor of the automobile, and means for displacing said auxiliary carriage together with said seat unit relative to said main frame as an incident to tilting of one of said back members.

14. For use in an automotive vehicle, a shiftable seat assembly designed to provide for convenient access to the rear of the assembly and comprising, in combination, a seat unit having a movable back member thereon tiltable to a forward position to afford access to the rear of the seat unit, translatory shifting means interconnected with said seating unit and interengageable responsively with said back member for temporarily shifting said seat unit forwardly to an out-of-the-way position in response to forward tilting movement of said back member and for moving said seat unit rearwardly in response to rearward tilting movement of said back member, and seat adjusting means interconnected with said seat unit for limiting rearward movement of said unit by said shifting means to determine the normal position of said unit, said adjusting means being independently operable to adjust said normal position of said seat unit.

15. A passenger seating assembly for use in an automotive vehicle and comprising, in combination, a seat unit having a back member movably mounted thereon, said back member being movable forwardly on said unit to provide convenient access to the rear of said seat unit, power energized shifting means connected to said seat unit for selectively producing forward and reverse translation thereof, control means operatively connected with said shifting means and interengageable responsively with said movable back member for operating said shifting means to displace said seating unit to a forward out-of-the-way position in response to forward movement of said back member and to shift said seat unit reversely in response to rearward movement of said back member, adjusting means for adjusting the normal position of said seat unit in a fore-and-aft direction, and said adjusting means being interconnected with said seat unit for limiting rearward movement of said seat unit by said shifting means at various pre-selected positions.

ARTHUR I. APPLETON.

References Cited in the file of this patent

UNITED STATES PATENTS

| Number | Name | Date |
|---|---|---|
| 1,087,003 | Engel | Feb. 10, 1914 |
| 1,636,078 | Schreiber | July 19, 1927 |
| 2,283,761 | Richter | May 19, 1942 |